No. 724,650. PATENTED APR. 7, 1903.
J. ZOBEL.
MACHINE FOR CLEARING FIELDS, ROADS, OR THE LIKE.
APPLICATION FILED AUG. 14, 1900.
NO MODEL. 4 SHEETS—SHEET 1.
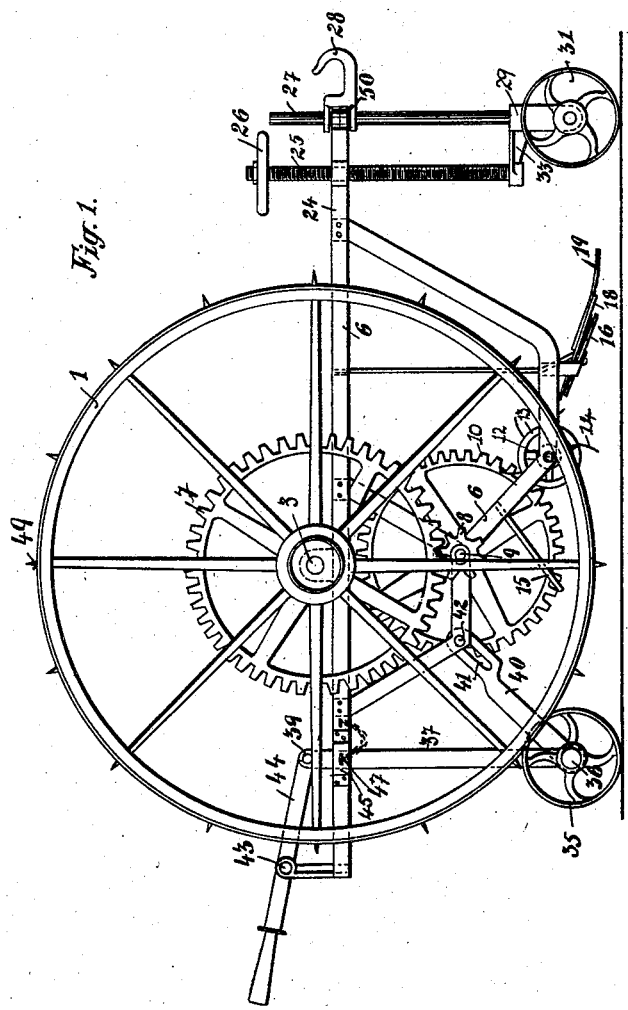

No. 724,650. PATENTED APR. 7, 1903.
J. ZOBEL.
MACHINE FOR CLEARING FIELDS, ROADS, OR THE LIKE.
APPLICATION FILED AUG. 14, 1900.
NO MODEL. 4 SHEETS—SHEET 2.
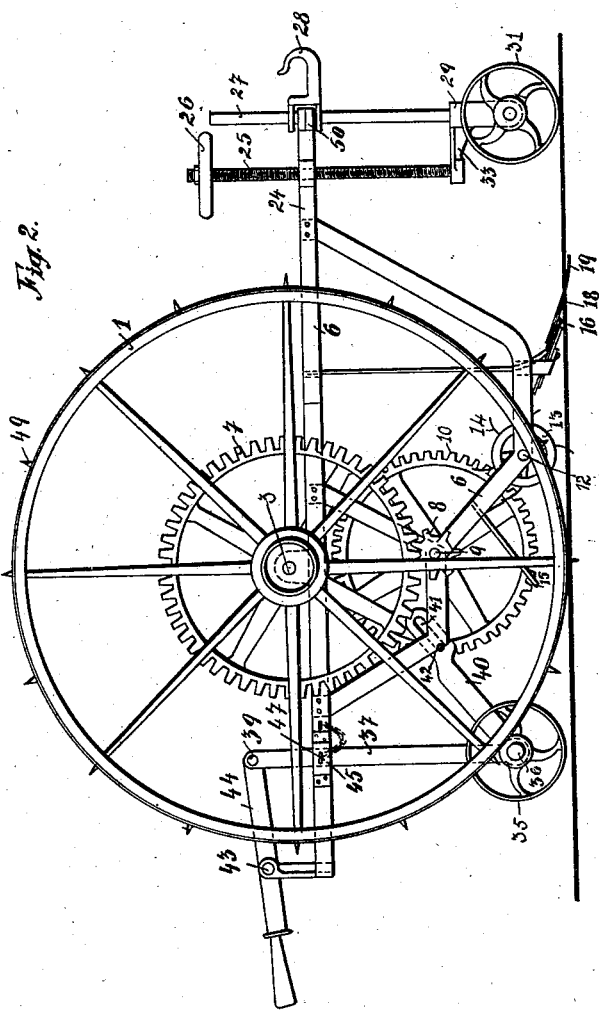
Witnesses:
Inventor,
Julius Zobel No. 724,650. PATENTED APR. 7, 1903.
J. ZOBEL.
MACHINE FOR CLEARING FIELDS, ROADS, OR THE LIKE.
APPLICATION FILED AUG. 14, 1900.
NO MODEL. 4 SHEETS—SHEET 3.
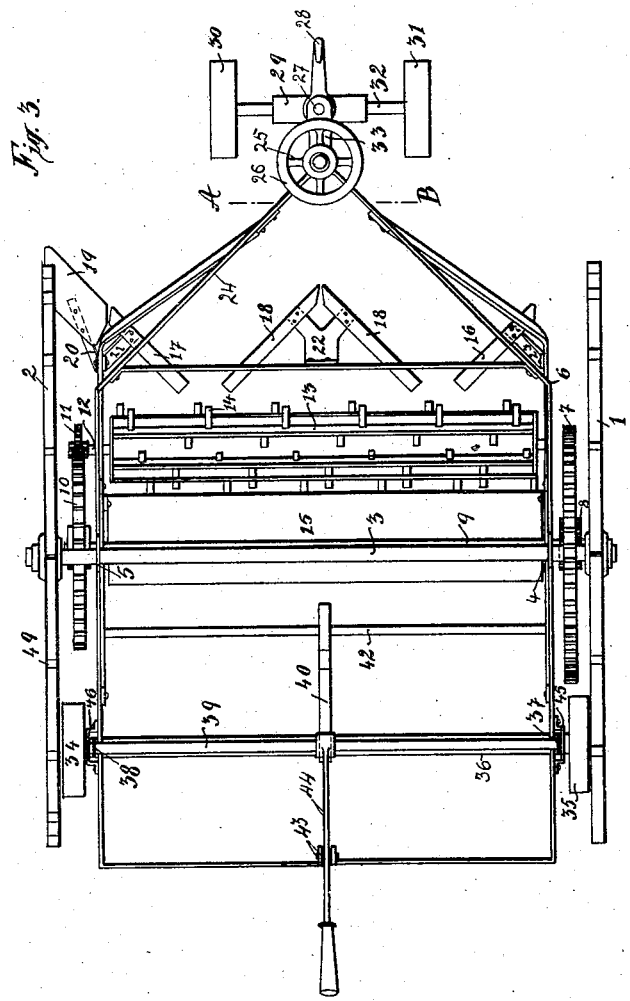

No. 724,650. PATENTED APR. 7, 1903.
J. ZOBEL.
MACHINE FOR CLEARING FIELDS, ROADS, OR THE LIKE.
APPLICATION FILED AUG. 14, 1900.
NO MODEL. 4 SHEETS—SHEET 4.
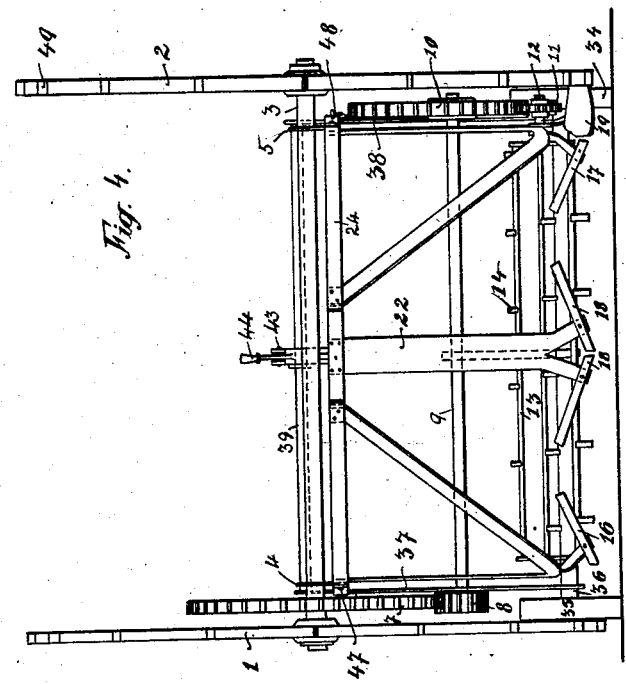

UNITED STATES PATENT OFFICE.

JULIUS ZOBEL, OF JULIUSBURG, GERMANY.

MACHINE FOR CLEARING FIELDS, ROADS, OR THE LIKE.

SPECIFICATION forming part of Letters Patent No. 724,650, dated April 7, 1903.

Application filed August 14, 1900. Serial No. 26,848. (No model.)

*To all whom it may concern:*

Be it known that I, JULIUS ZOBEL, master blacksmith, a subject of the German Emperor, at present residing at 2-3 Ring, in the town of Juliusburg, district of Oels, Kingdom of Prussia, German Empire, have invented a certain new and useful Machine for Clearing Fields, Roads, or the Like, of which the following is a specification.

This invention has reference to a machine for clearing away grass, wild herbs, and weeds of all kinds on highways, in parks, and the like; and it allows at the same time the planing of the road upon which the machine is operating.

My invention is illustrated in the accompanying drawings, by way of example, in a preferred form of construction.

Figures 1 and 2 show the device in side view in two different positions of the operating parts. Fig. 3 is a top view, and Fig. 4 is a sectional view on the line A B of Fig. 3.

1 and 2 are the driving-wheels of the machine, which are mounted upon the wheel-axle 3, which is rotatably journaled in the supports 4 5 upon the frame 6 of the machine. On the outside of the frame 6 the axle 3 has the gear-wheel 7 mounted thereon, which is in engagement with the pinion 8, mounted upon the shaft 9, journaled in the frame 6, and to the other extremity of which is secured the gear-wheel 10, engaging with the gear-wheel 11. The latter is mounted upon a shaft 12, which is rotatably journaled in the frame 6, like the shafts 3 and 9. Upon the shaft 12 is mounted a drum 13, upon the surface of which are arranged several series of prongs 14, arranged radially in rows, (there being six rows, for instance, in the preferred form of construction shown in the drawings,) so that the prongs of one row alternate with those of the next succeeding or next following row. A rebounding-plate 15, rigidly fixed to the frame, is arranged behind the drum 13. Upon the front side of the machine I arrange two knives 16 17, (best shown in Figs. 3 and 4 of the drawings,) which are set at an angle to each other. The knives inclose a wedge-shaped double knife 18. Though the length of the knives is optional, still it is of course preferable to so adjust the length and size of the knives that the cutting will be effected upon the whole breadth of the machine in one operation. The wedge-shaped arrangement of the knives first acts to part the grass or weeds and turns them to the side, and in the ratio as the machine advances the stalks are compressed by the constantly-narrowing space between the knives 18 and 17 and 18 and 16, respectively, and they are thereby forced against the blades of the knives and cut clear off. A plowshare 19 is fixed at the outside of the frame 6. The parts 16 to 19 are secured to the said frame by means of stays and cross-bars 20 21 22 23. The front end of the frame 6 is continued at 24, Figs. 1 and 2. In the middle or about in the middle of the said continuation 24 is journaled the spindle 25, to the extremity of which is attached the hand-wheel 26, and which may be turned up and down by threads provided in the continuation 24, which terminates in a loop or ring 50, by means of which the extremity of the frame is guided along the bar 27. The hook 28 is secured to the loop 50 by its forked ends, so that it will be displaced along with the frame upon the bar or bolt 27. The lower extremity of the bolt 27 is fastened to the frame 29, Fig. 3, upon which are journaled the wheels 30 31 upon the shaft 32. A lug 33 upon the frame 29 serves as a support for the spindle 25. To the rear part of the frame 6 is journaled the pair of wheels 34 35 upon the shaft 36, Figs. 1 to 3. Upon the same shaft 36 are rotatably mounted the bars 37 38, Figs. 3 and 4, which are rigidly connected with each other by the shaft 39. Upon the shaft 36 is also rotatably mounted the connecting-piece 40, through the slotted extremity 41 of which passes the connecting-rod 42, which latter is rigidly attached to the frame 6, Figs. 2 and 3. Upon the frame 6 is further rotatably mounted at 43 the two-armed lever 44, which is pivoted at its front end to the connecting-rod 39. The stays or bars 37 38, which are attached to the rod 39, are loosely passed through fish-plates 45 46, fixed to the frame 6, both the fish-plates and the bars 37 38 being provided with holes for adjustment in various positions by means of the pins 47 48.

The device described operates as follows: The driving-wheels 1 and 2, which in order to prevent their gliding upon the soil are provided with spurs 49, by their rotation actuate the gear-wheels 7 8 10 11 and the drum 13. Now since at the same time the whole machine is advancing it is obvious that the herbs and grass in front of the machine will thereby also be cut or raised by the knives 16 17 18, so as to come within reach of the drum 13, the prongs of which catch hold of the grass, weeds, and sods of soil, tear the same into minute fragments, and throw the pulverulent mass against the plate 15, from which the heavier earth and then the lighter grass and weeds are thrown back, the grass and weeds being deposited on top of the heavier earth, so that they may be easily raked together after the machine has passed, the heavier earth particles serving at the same time to cover any deep cuts or fissures that might have been made by the knives or the plowshare. I also provide means whereby after the operation of removing the weeds, grass, and the like is finished the wheels 1 and 2 may be thrown out of gear and the wheels 34 35 thrown into action, by means of which the machine is driven forward without doing any work. In Fig. 1 of the accompanying drawings I have shown the machine in this position, the double-armed lever 44 being raised at its rear and depressed with its other extremity, so as to lower the wheels 34 35 from the position they assume in Fig. 2 to that shown in Fig. 1 of the drawings, where they touch the ground. The depression of the front end of the lever 44 also results in the raising of the frame on the connecting-rod 40, and consequently of the wheels 1 and 2, which are thereby raised out of contact with the soil, so that their rotation and that of the whole mechanism of the machine is stopped. The spindle 25 is then rotated, whereby the front end of the machine is raised, so that the machine is now resting upon the wheels 30 31 34 35.

When the machine is operating, the spindle 25 serves to raise or lower the frames 6 and 24, whereby the knives 16 17 18 and the plowshare 19 are correspondingly raised or lowered and made to cut the soil to different depths. The plowshare 19 serves for cutting away the grass and weeds at the side of the road and in front of the wheel 2, which are not acted upon by the drum 13.

The knives 16 17 18 are preferably so arranged that they are capable of penetrating into the ground to a certain depth at their front ends, so as to dig out the roots of smaller weeds and shrubs. Any inequalities of the ground that might be produced thereby will be equalized partly by the tails of the knives, having more of a shaving smoothening action and also by the subsequent raking operation, as above set forth.

It is obvious that my machine is capable of various modifications in the form and construction of the different parts without departing thereby from the spirit of my invention.

I am aware that it is not new to use the driving-wheels as a means to operate a drum; but in the former constructions the cutting action was chiefly effected by knives or blades attached to said drum, while in my invention the drum has only a distributing and grinding action on the previously-cut-off material. I am also aware that it is not broadly new to employ angularly-arranged cutting-blades in connection with means to raise the wheels of the machine; but this is entirely different from my invention, where two sets of angularly-arranged knives are used, the middle part of which acts as a wedge; nor was it known before my invention to employ two sets of wheels in connection with inclined cutting-knives and with means to render one set of the wheels inoperative and throw the other into action whenever desired.

What I claim, and desire to secure by Letters Patent of the United States, is—

1. A machine for clearing roads, parks and the like and for cutting away shrubs, grass and the like, comprising the combination with wheels and a rotating drum operated by said wheels of cutting-knives forming a zigzag line and a frame wherein the said knives and the actuating-wheels for the drum are rigidly mounted, separate front and back wheels, loosely and independently mounted in said frame and means whereby any pair of wheels and the knives may be raised or lowered.

2. A machine for clearing roads and cutting shrubs and the like, comprising a frame, cutting-knives, fastened to said frame and arranged in a zigzag line, a lever fulcrumed in said frame and wheels separate from said frame and operated by said lever, driving-wheels mounted in said frame, a drum actuated by said driving-wheels and operative connection between the lever and said frame whereby the wheels may be alternately raised or lowered by operating said lever, substantially as described.

3. A machine for clearing roads and cutting shrubs and the like, comprising a frame, cutting-knives fastened to said frame and arranged in a zigzag line, front and rear wheels mounted loosely in said frame, a drum and driving-wheels for said drum mounted rigidly in said frame, means journaled in the frame to change the relative positions of the said frame and of the front and rear wheels respectively in combination with means to lock the frame in position, substantially as described.

4. In a machine for clearing roads and for cutting shrubs and the like, in combination, a frame, carrying driving-wheels and cutting-knives arranged in a zigzag line, a drum operated by said driving-wheels, front and rear wheels in front and at the rear of the driving-wheels and separate from the frame, a connecting-arm rigid on the shaft of the rear wheels, one end of said arm being slotted, a connecting-rod in the driving-wheel-supporting frame and displaceable within the slotted arm and means to operate said arm whereby the driving-wheels and the cutting-knives may be displaced contrary to the displacement of the rear wheels.

In witness whereof I have hereunto set my hand in presence of two witnesses.

JULIUS ZOBEL.

Witnesses:
   AUGUST WAKILOTZ,
   HERMANN BARTSCH.